3,475,399
SATURATION OF POLYALKYLENES
Edwin F. Peters, Lansing, and Omar O. Juveland, South Holland, Ill., assignors to Standard Oil Company, Chicago, Ill., a corporation of Indiana
No Drawing. Filed Apr. 26, 1966, Ser. No. 545,240
Int. Cl. C08f 27/25
U.S. Cl. 260—93.7            6 Claims

ABSTRACT OF THE DISCLOSURE

A process for reducing the double bond content of polyalkylenes whereby a 1-olefin is polymerized over a dispersed compound of a transition metal selected from Groups 5a and 6a, recovering said product in a finely divided form containing the polymerization catalyst, then contacting said catalyst from reaction with hydrogen.

---

This invention relates to the saturation of double bonds in polyalkylenes whereby the stability of such polyalkylenes against oxidative degradation is improved. More particularly, our invention is the hydrogenation of polyalkylene double bonds using as hydrogenation catalyst the residual catalyst remaining dispersed in polymer either in unpromoted form or with restored promoter activity.

In the preparation of polyalkylenes from 1-olefins such as ethylene, propylene, butylene and higher 1-olefins, it is possible to recover particulate product when certain catalyst systems and certain reaction conditions are used. For example, polymer prepared over chromia on a finely divided silica support, in accordance with the process of U.S. 3,132,125, can be recovered as finely divided particulate matter when the reaction temperature is maintained below the melting point of the polymer product and the product is insoluble in the reaction solvent. Similarly, high molecular weight particulate polymer is obtainable from finely divided aluminum hydrocarbon-promoted Group 5a and 6a transition metal oxide catalysts (as set forth in the Periodic Classification of the Elements, T. Moeller, Inorganic Chemistry, p. 122 (J. Wiley & Sons, 1952)) used in accordance with the techniques of U.S. 2,963,447; 2,936,291; 2,912,419 and 2,824,089 by selection of a reaction temperature below the melting point of the polymer product and use of a reaction medium in which the polymer product is insoluble. Finely divided particulate polymer is particularly easily obtained through use of an aluminum hydrocarbon-promoted vanadium pentoxide suspended on a finely divided silica support, as will be more specifically set forth hereinbelow.

The polyalkylene products prepared as described above almost always contain unsaturation as a consequence of chain termination reactions. This unsaturation can be the source of oxidative degradation of the polymer and for many applications it is desirable to reduce the unsaturation below its initial value. By such a reduction in unsaturation, it is possible to prepare oxidation-stable polymers containing smaller amounts of oxidation stabilizers, for example, Ionol (t-butyl catechol) or DLTDP (dilauryl thiol-dipropionate), than would otherwise be necessary for the preparation of a polyethylene suitable for use under adverse conditions, such as in exterior applications where exposure to sunlight is encountered.

Our process involves the hydrogenation of finely divided polyalkylene as recovered from polymerization reactions following separation of reaction medium and unreacted monomer. The temperature for the hydrogenation should be below the melting point of the polyalkylene in order for the hydrogen to be capable of good contact with the bulk of the polymer which remains in powdered form. If a polymer of very low melt index, for example, less than about 0.1, is to be treated, a temperature higher than the melting point can be employed since the resistance to flow of such polymer is sufficient to maintain it in particulate form at least during the time necessary for effective treatment. The temperature should be maintained below the point at which the polymer loses its discrete particulate state, such temperature being termed by us as the deformation point. Good contact is readily achieved with the particulate product obtained from polymerization reactions wherein a non-solvent medium and a low enough temperature are employed so that the polymer product is recovered as discrete particles.

We have found that both Group 5a and Group 6a metal compound residues, particularly the Group 5a and 6a metal oxides on inert supports, are effective for the hydrogenation of double bonds in accordance with our invention. Effective amounts of catalyst residue range from as little as 1 part in 20,000 parts of polymer and even lower to as much as 1 part in 100 parts of polymer and even higher, where the catalyst contains from about 1 to about 10 weight percent of transition metal compound. Additionally, we have found that a surprisingly increased hydrogenation activity is achieved when a small amount of an aluminum hydrocarbon compound is added to the polymer being treated, in an amount ranging from as little as 0.00025 g. mole to as much as 0.0025 g. mole per 100 g. polymer, and greater. As will be apparent to those skilled in the art, simple experimentation will readily provide an indication of the optimum amount of a particular aluminum hydrocarbon to be added, this depending upon a balancing of the rapidity of hydrogenation against the expense of adding aluminum compound and the inconvenience of removing excess aluminum hydrocarbon, when that is necessary. We are not certain of the mechanism of the hydrogenation in the presence of the aluminum hydrocarbon, but believe that the aluminum compound may add to the unsaturation, following which the hydrogen may cleave the bond to the aluminum atom and cause the formation of a paraffinic structure.

Suitable aluminum hydrocarbons for use in our invention are such as conform to the general formula $$AlR_1, R_2 \text{ and } R_3$$

wherein $R_1$, $R_2$ and $R_3$ are the same or different monovalent radicals, selected from the class consisting of hydrogen and monovalent hydrocarbon radicals. Typical of such compounds are aluminum trimethyl, aluminum triethyl, aluminum tri-isobutyl and the like.

The hydrogen pressure to be employed in the practice of our invention can range from as little as 100 p.s.i.g. to as much as 2000 p.s.i.g. and higher, the upper limit being dictated by the inconvenience in handling high hydrogen pressures rather than by any failure of the saturation to take place. As will be understood by workers in this art, hydrogen diluted with inert gas can be employed.

The time of treatment will depend on the extent of saturation desired and the hydrogen pressure under which reaction is performed. This can be as little as 0.5 hour or less to as much as 24 hours or more. We have generally used treatments of about 20 hours as a matter of experimental convenience.

The preparation of a particulate polymer suitable for the application of our inventive hydrogenation technique was effected as follows:

A catalyst comprising 3.7 weight percent vanadium pentoxide extended upon Cab-O-Sil M–5 silica (a finely divided silica produced by Godfrey L. Cabot, Inc. by vapor-phase hydrolysis of a silicon compound and having a particle size of 150–200 A.) was calcined in an oxygen stream while being heated from 25 to 550° C. over one hour. The catalyst was calcined an additional 0.25 hour at 550° C. and 0.015 g. of the hot catalyst was charged under argon to a 530 ml. stainless steel rocker bomb which had been heated to 130° C. This was sealed and evacuated to 0.1 mm. Hg while cooling to 25° C. To the bomb there was next added 225 ml. purified n-heptane and ethylene was pressured in to 10 p.s.i.g. Next there was added 0.222 g. of aluminum tri-isobutyl in 1.0 ml. of n-heptane solution. The mol ratio of $AlR_3$ to $V_2O_5$ was about 367.

Next the bomb was pressured to 400 p.s.i.g. with ethylene and heating was begun. Within an hour the bomb reached 190° F. and additional ethylene was pressured in to maintain reaction pressure in the range 725 to 900 p.s.i.g. The reaction was carried out for about one hour at 190° F. The bomb was cooled and from it there was recovered 217 g. of a white, non-fused heptane-moist solid polymer. This was dried in a vacuum oven overnight at 50° C. to yield 96.7 g. of solid polymer.

A polymer prepared as described above was examined for unsaturation by infrared techniques and was found to have the double bond content listed in the table for the product identified as Example 1. This product was air-dried to destroy residual aluminum hydrocarbon promoter and then hydrogenated for one hour at 21° C. and nineteen hours at 99° C. Heating of the polymer was begun at the start of the time period and the temperature rose rapidly to the ultimate value of 99° C., where it was held for the major portion of the time. The hydrogen pressure applied was 1000 p.s.i.g. The double bond content of polymer thus treated is shown in the accompanying table for Example 2.

It is evident from a comparison of the analyses of the above polymers that our hydrogenation treatment effected a considerable reduction in unsaturation.

Examples 3 and 4 provide a comparison of unsaturation between untreated polymer and polymer treated according to our invention, where a relatively large amount of residual catalyst was involved. The polymer was exposed to hydrogen for about two hours at room temperature and about twenty hours at 99° C. It can be seen from a comparison of results of Examples 2 and 4 that the vanadia content of the catalyst and the total amount of catalyst have no significant effect upon the hydrogenation reaction. Similarly the hydrogenation will occur with any catalyst having appreciable catalytic activity for polymerization.

The enhanced hydrogenation available when a small amount of aluminum hydrocarbon is added to the polymer being hydrogenated can be seen from Examples 5 and 6 presented in the table hereinbelow. The polymer products were prepared over vanadium pentoxide-silica catalysts. A 1.0 g. amount of aluminum tri-isobutyl in n-heptane was added to the polymer product of Example 6 just before hydrogenation. Hydrogenation was carried out under the indicated conditions for about 20 hours total time. The results from infrared analyses for unsaturation amounts show that additional aluminum hydrocarbon enhances saturation.

TABLE

| Experiment | Catalyst Content of Polymer (g. catalyst/g. polymer) | Hydrogenation Treatment | Unsaturation Amount and Type | | |
|---|---|---|---|---|---|
| | | | Trans C=C | Vinyl C=C | Vinylidene C=C |
| Example 1 | 1/6,450 | None | 0.017 | 0.83 | 0.049 |
| Example 2 | 1/6,450 | 21-99° C.; 1,000 p.s.i.g. | 0.00 | 0.56 | 0.00 |
| Example 3 | 1/3,870 | None | 0.00 | 0.94 | 0.00 |
| Example 4 | 1/3,870 | 21-99° C.; 1,000 p.s.i.g. | 0.00 | 0.57 | 0.00 |
| Example 5 | 1/5,780 | 21-99° C.; 1,000 p.s.i.g. | 0.028 | 0.98 | 0.051 |
| Example 6 | 1/5,780 | 21-99° C.; 1,000 p.s.i.g. | 0.00 | 0.26 | 0.00 |

In the above table, the relative number of double bonds per 1000 carbon atoms was determined by measuring the infrared absorption at 962 cm.$^{-1}$, 908 cm.$^{-1}$ and 888 cm.$^{-1}$ using base line technique and McMurray and Thornton's intensity coefficients. No corrections were made for interferences and density variation.

The melt indices of products in Examples 5 and 6 were 0.00 before and after treatment, indicating that no detectable chain cleavage occurred. Melt indices were determined by ASTM Method D 1238–62–T in ASTM Standards on Plastics, 13th ed., pages 690–694, November 1962. From the above results, it is apparent that our novel hydrogenation process is especially effective when performed in the presence of added aluminum hydrocarbon compound.

Similar double bond saturation can be achieved by treatment of polyalkylenes made from propylene, butylene, higher 1-olefins and copolymers thereof when such products are obtained as polymerization products containing dispersed Group 5a and 6a metal compounds having catalytic hydrogenation activity. The necessity of adjusting polymerization time, temperature and pressure for desired results with different polyalkylenes will be obvious to those skilled in the art and optimum conditions can be determined by simple experimentation within the scope of our invention.

The polymer products of our invention can be extruded and molded into useful articles such as bottles, combs, tubes, cups and the like, either as produced or following mechanical milling, the addition of known antioxidants, stabilizers, fillers, extenders, plasticizers, pigments and the like. The utility of such materials is so well known to those skilled in the art as to need no repetition.

Various modifications of the specific examples set forth herein within the scope of our invention will be apparent to those skilled in the art.

Having thus described our invention, what we claim is:
1. A process for reducing the double bond content, as determined by infrared measurements, of polyalkylenes, which comprises
    (a) polymerizing a 1-olefin to a finely divided particulate polyalkylene product by means of a polymerization reaction over a dispersed compound of a transition metal selected from Groups 5a and 6a as catalyst,
    (b) recovering said polyalkylene product from said polymerization reaction in a finely divided particulate form and containing said catalyst from said polymerization reaction in an amount catalytically effective for hydrogenation, and
    (c) contacting said polyalkylene containing said catalyst from said polymerization reaction with hydrogen at a temperature below its deformation point for a time sufficient to reduce the double bond content.

2. The process of claim 1 wherein the transition metal is chromium.

3. The process of claim 1 wherein the transition metal is vanadium.

4. The process of claim 2 wherein the polyalkylene is a polymer of a lower 1-olefin selected from the group consisting of ethylene, propylene and butylene.

5. The process of claim 3 wherein the polyalkylene is a polymer of a lower 1-olefin selected from the group consisting of ethylene, propylene and butylene.

6. The process of claim 1 wherein the polyalkylene is polyethylene, wherein the transition metal is vanadium and wherein the temperature is below the melting point of the polyalkylene.

References Cited

UNITED STATES PATENTS 3,285,902  11/1966  Schmeidl _____ 260—93.7

OTHER REFERENCES

Chem. Abs., vol. 64, p. 5225 h, Feb. 14, 1966.

JOSEPH L. SCHOFER, Primary Examiner

R. A. GAITHER, Assistant Examiner

U.S. Cl. X.R.

260—94.9, 690